United States Patent Office 2,857,541
Patented Oct. 21, 1958

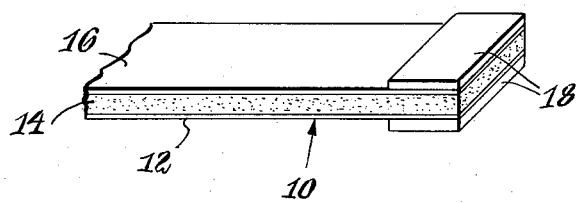
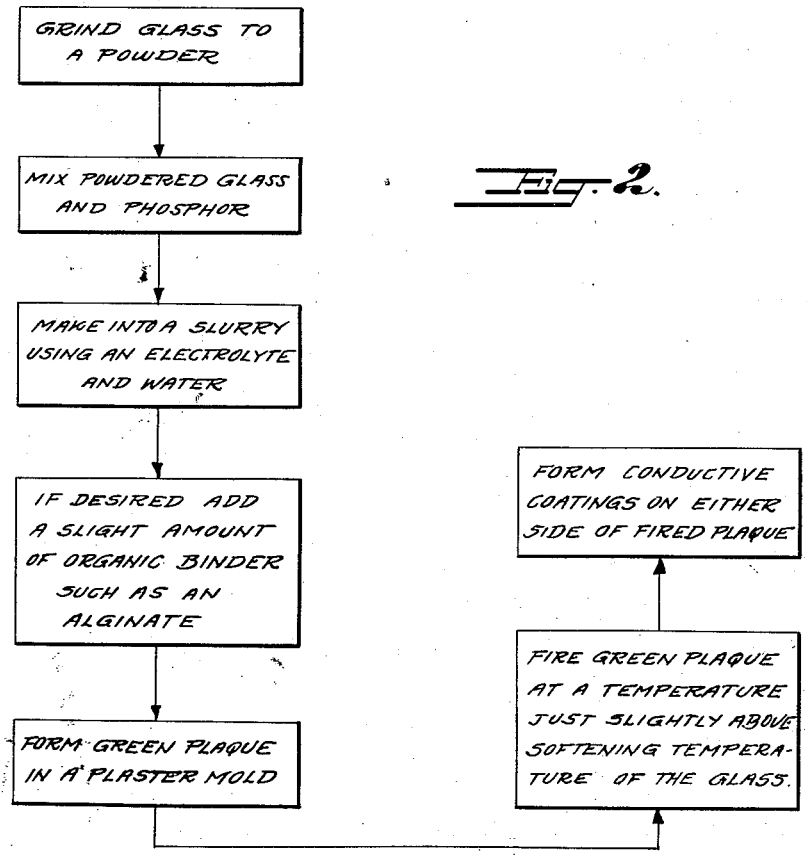

2,857,541

THIN SHEET OF PHOSPHOR EMBEDDED GLASS AND METHOD OF PREPARING

Eugene P. Etzel, Upper Montclair, and Chung Kwai Lui Wei, Bloomfield, N. J., assignors to Westinghouse Electric Corporation, East Pittsburgh, Pa., a corporation of Pennsylvania Application March 29, 1954, Serial No. 419,232

1 Claim. (Cl. 313—108)

This invention relates to thin sheets of phosphor or luminescent material embedded glass and to methods of making same, and more particularly, to electroluminescent cells which incorporate thin sheets of phosphor embedded glass as a phosphor-dielectric.

Heretofore, electroluminescent cells have been made as described in Patent No. 2,566,349 to Mager, or as described in New Phenomenon of Electrophotoluminescence by G. Destriau, Philosophical Magazine, October 1947, vol. 38, pp. 700–737.

In such electroluminescent cells, or electroluminescent lamps as they are also called, the phosphor material is normally embedded throughout a thin sheet of plastic-dielectric which dielectric preferably has as high a dielectric constant as possible and which dielectric is made as thin as practicable in order to increase the electric field between the cell electrodes. A plastic dielectric has several disadvantages. Many of the plastic dielectrics are thermoplastic in nature and tend to soften at relatively low temperatures, e. g. 70° C. to 100° C. in the case of cellulose acetate. Since it is sometimes desirable to operate these electroluminescent cells at temperatures within or above the softening range of the plastic-dielectric, it is necessary to provide a backing plate of glass or other suitable material for the cell in order to give the cell sufficient rigidity so that it can support even its own weight.

An even greater disadvantage to the use of a plastic as the dielectric material is the tendency of plastics to slowly absorb moisture from the air. This moisture absorbing characteristic lowers the dielectric strength thereby decreasing the brightness of the cell and causing eventual premature breakdown of the cell.

To overcome these water absorbing and softening characteristics of plastics, it has been proposed to replace the plastic dielectric with a glass dielectric, since glass can be made relatively impervious to atmospheric water vapor, thereby enabling the cell to retain its brightness and preventing a premature breakdown of the dielectric. In addition the cell can be operated at elevated temperatures.

Various means are known for forming sheets of impregnated glass. In one of these methods ground glass and the impregnating material, in this case the phosphor, are deposited in finely divided form on a plate to the desired thickness and the glass is fired to cause it to fuze. In another method, the phosphor and powdered glass are suspended in a liquid medium such as water and allowed to slowly settle onto a plate. The liquid medium is then drained off and the layer of powdered glass and phosphor are then fired to cause the glass to fuze.

In these methods of the prior art for fabricating the thin sheets of phosphor-glass dielectric, the results have been very unsatisfactory due to the tendency of the glass to have many air bubbles and discontinuities. Such air bubbles and discontinuities cannot be tolerated in an electroluminescent cell for they constitute small areas in which the total dielectric between the cell electrodes is decreased, thereby causing the cell brightness to vary and forming weak points at which breakdown, or arcing between electrodes, will occur.

It is the general object of the invention to avoid and overcome the foregoing and other difficulties of and objections to prior art practices by the provision of a method of forming a thin sheet of phosphor embedded glass.

It is a further object to provide a thin sheet of phosphor embedded glass wherein there are substantially no discontinuities and/or air bubbles in the glass dielectric.

It is another object to provide a method of making an electroluminescent cell wherein the dielectric consists of a glass.

It is still another object to provide an electroluminescent cell wherein the dielectric is a glass.

It is yet another object to provide an electroluminescent cell which can be operated at elevated temperatures.

The aforesaid objects of the invention, and other objects which will become apparent as the description proceeds, are achieved by providing a method of making a thin sheet of glass-phosphor which method comprises making a water-electrolyte slurry of phosphor and powdered glass, pouring the slurry into a plaster mold to form a green plaque, and firing the green plaque to fuze the glass. This results in a thin sheet of phosphor embedded glass which has substantially no discontinuities or air bubbles.

For a better understanding of the invention reference should be made to the accompanying drawing wherein:

Fig. 1 is a perspective view of an electroluminescent cell embodying the thin sheet of phosphor embedded glass of this invention.

Fig. 2 is a flow diagram illustrating the method used in fabricating the thin sheet of phosphor embedded glass of this invention.

Although the principles of this invention are broadly applicable to thin sheets of phosphor impregnated glass and to methods of making same, the invention has particular application in electroluminescent cells and hence has been so illustrated and will be so described.

With specific reference to the form of the invention illustrated in the drawing, the numeral 10 indicates generally an electroluminescent cell comprising a first electrode 12, which may consist of a thin transparent sheet of tin oxide, if desired. Over the first electrode there is positioned a thin sheet of phosphor embedded glass 14 and a second electrode 16 is placed over the phosphor-glass dielectric. This second electrode may consist of a thin sheet of vaporized aluminum or silver or may consist of a thin transparent sheet of tin oxide if it is desired that both electrodes be transparent. Thin copper ribbons 18 may be soldered or otherwise electrically connected to the electrodes, if desired, to facilitate making electrical contact to the cell electrodes.

The glass in which the electroluminescent phosphor is embedded and which serves as the dielectric must meet several requirements: First, the glass is preferably transparent in order to pass the light generated by the phosphor, but a translucent glass will be satisfactory if some efficiency is to be sacrificed. Second, when melted, the glass should not take the electroluminescent phosphor into solution nor chemically attack nor combine with the phosphor. For example, if a zinc sulfide phosphor is used, it is desirable not to have any lead, nickel or copper present in the glass or it is apt to deleteriously affect the phosphor. Of course, if other phosphors were to be used and would not react with these heretofore mentioned glass components, it would be satisfactory to use these glasses, an example being lead tellurite glass which has a very high dielectric constant (between 25–30). It should be noted, however, that zinc sulphide phosphors may be embedded in lead tellurite glass if they are first encased in a thin protective coating such as silica, as described in Patent No. 2,151,496 to Beese. This will serve to protect against interaction between the phosphor and the glass during fabrication of the thin phosphor-glass sheet of this invention. As a specific example, the tellurite glass may have the composition 80.4% $TeO_2$, 13.5% PbO, and 6.1% BaO, which glass has a dielectric constant of about 27.5. Since most glasses and plastics have a dielectric constant between about 4 to 7 and electroluminescent cell brightness is proportional to dielectric constant, the advantages realized through the use of lead tellurite glass can readily be appreciated; namely a great increase in cell brightness. Third, the glass should have a low viscosity when melted in order to enable it to flow together effectively about the phosphor and form a thin even sheet. For example, a viscosity of from 145 to 165 dynes/cm. at 700° C. is suitable. This desired viscosity is not intended as a limitation, but is only given as an indication of what will produce the best type thin phosphor-glass sheet.

There desirably is present in the glass a flux to facilitate glass fusion, examples being sodium oxide, calcium oxide, magnesium oxide, lithium oxide, or potassium oxide or other suitable fluxing agents. There should also be present in the glass a stabilizing agent such as barium oxide, aluminum oxide, silicon dioxide or calcium oxide, or other suitable stabilizing agent which will promote hardness in the glass and keep it from being water soluble.

The number of different glasses which will meet these foregoing requirements is very large and any man skilled in the art can readily name several dozen different suitable glasses without even referring to reference texts. Examples of satisfactory glasses are as follows:

Example I

| Component: | Percent by weight |
|---|---|
| ZnO | 5 |
| $Al_2O_3$ | 1 |
| $SiO_2$ | 10 |
| $Na_2O$ | 5 |
| $B_2O_3$ | 79 |

Example II

| Component: | |
|---|---|
| $B_2O_3$ | 48 |
| CaO | 20 |
| BaO | 12 |
| $Al_2O_3$ | 16 |
| MgO | 4 |

Example III

| Component: | |
|---|---|
| $B_2O_3$ | 40 |
| CaO | 24 |
| BaO | 16 |
| $Al_2O_3$ | 16 |
| MgO | 4 |

In preparing the thin sheet of phosphor-glass of this invention, the glass comprising the dielectric is first ground in an agate mortar or pulverized by other conventional mixing means such as hammer-milling for about 30 minutes or until the powdered glass will pass a 200 mesh sieve and catch on a 325 mesh sieve (U. S. Standard sieve series). This degree of fineness is in no way critical, but represents what is considered to be a generally satisfactory degree of pulverization. Phosphor or luminescent material is then mixed with the glass in amount of about ½% by weight of the glass, although the phosphor may vary from about 0.01% to 4% by weight of the glass. The powdered glass and phosphor are then thoroughly mixed by stirring, shaking, vibrating or other conventional mixing techniques.

The mixed powdered glass and phosphor are then incorporated in a slurry by adding water in amounts which may vary from about 3½ to 5 times the weight of the phosphor and glass. An electrolyte is also added to the slurry in amounts which may vary from about 0.5 gram to 2 grams of electrolyte per liter of slurry, although the amounts of electrolyte which may be added may vary greatly over wide limits depending upon the choice of the electrolyte and the strength of the electrolyte used. The purpose of the electrolyte is to deflocculate the glass and phosphor particles by giving them a slight charge so that they will repel one another and be evenly dispersed.

Although it is not necessary, it is desirable to add a binder to the slurry in amounts which may vary from traces (e. g., .01%) to about 3% by weight of the slurry. This tends to lend adhesiveness, or so-called "green strength" of the particles for one another when they are formed into a green plaque, as hereinafter explained. Most any commercially available binder is suitable but as an example any of the alginates, glucose or dextrine may be used. By way of explanation alginates are water soluble salts of alginic acids extracted from a giant kelp plant of the Pacific Ocean.

The slurry is thoroughly mixed and then poured into a moisture-absorbing mold such as one of plaster of Paris, which mold has the desired general shape of the thin sheet of phosphor-glass. The mold of plaster of Paris or the like withdraws the water from the slurry leaving a green plaque which is quite compact due to packing effect experienced as the water is drawn by the plaster of Paris mold. A mold is desirably formed in multiple parts so that one half of the mold may be lifted after the green plaque is formed, without disturbing the plaque.

The green plaque is then removed from the remaining half of the mold without cracking it by means of thin spatulas which may be inserted under the green plaque to support it, or by means of a formed receptable which has the configuration of the green plaque and in which receptacle the plaque may be fired. If such a formed receptacle is used, the upper portion of the mold is removed and the receptacle placed over the exposed part of the green plaque. The plaque is then inverted and the remaining portion of the plaster of Paris mold withdrawn leaving the green plaque in the receptacle.

It was unexpected that the green plaque would have sufficient body to enable it to hold together while in the green state before it was fired, particularly when the plaque may have an area of perhaps 4 square inches and a thickness of only about 2 mm.; for example. It is easy to conceive of making a wet or moist ball of sand or powdered glass adhere together without cracking, but it was completely unexpected that such a very thin sheet of material would adhere together in the green state without developing cracks or other discontinuities.

The green plaque in the receptacle, which receptacle may be platinum, if desired, is then placed in the firing ovens and fired in an atmosphere suitable to the glass and the phosphor at a temperature slightly above the softening temperature of the glass until the glass is substantially fused to itself and about the phosphor particles which are evenly dispersed therein. During the firing the organic binder, if one is used, will carbonize and volatilize from the phosphor-glass green plaque. Since such binders normally substantially completely volatilize at about 500° C., substantially no organic binder will remain in the plaque when the glass fuzes.

In forming the green plaque from the slurry, the plaque will shrink or compress about 3% from the volume of the plaster of Paris mold. When fired the green plaque will shrink about another 20%. Thus the plaster of Paris mold should have a volume about 22% or 24% greater than the desired volume of the fired phosphor embedded glass, although the general configuration of the fired phosphor embedded glass and the mold will be substantially the same.

As a specific example, 10 grams of the powdered glass of Example 1 may be mixed with 0.05 gram of zinc sulfide phosphor activated by $10^{-4}$ parts by weight of copper.

This powdered glass and phosphor are then thoroughly mixed and are incorporated into a slurry by adding about 40 grams of water to the phosphor-powdered glass mix and about 0.04 gram of barium acetate or 0.06 gram of 3 normal ammonium hydroxide, which mixture is agitated to form the slurry.

If desired, about 0.6 gram of triisopropanol amine salt of alginic acid may be added to the slurry as a binder.

The slurry is then poured into a plaster of Paris mold, which as an example may have a square configuration 4 inches on a side and a thickness of 2.5 mm. The slurry is allowed to remain in the mold until the water is substantially withdrawn and the green plaque becomes leather hard with a firm texture, which will take about 30 minutes, for example. The upper half of the plaster mold is then withdrawn, the plaque placed in a platinum receptacle and the green plaque and receptacle placed in a firing oven and fired in an air atmosphere for about 3 minutes at a temperature which is slightly above the softening temperature of the glass, which in the case of the specific example given may be about 690° C. The fuzed plaque is then withdrawn from the firing oven and allowed to slowly cool in air.

In order to fabricate the electroluminescent cell as illustrated in Fig. 1, thin transparent conductive coatings may be applied to either side of the phosphor-dielectric thin sheet as described in Patent No. 2,522,531 to J. H. Mochel or as described in Patent No. 2,667,428 to Young et al. If it is desired to make one of the electrodes opaque, this electrode may be applied as a thin coating or aluminum or silver by well known vacuum metallizing techniques. Connecting copper strips which facilitate electrical connection to the cell may then be applied as described in Patent No. 2,628,299 to Gaiser.

If it is desired to provide the electroluminescent cell with a backing plate to increase its mechanical strength glass or other nonconductive material may be applied over one of the electrodes and affixed to it by means of an adhesive such as a polymer resin containing the epoxide group

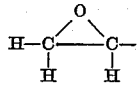

as the polymerizing unit. One such resin is manufactured by the Ciba Co. Inc. under the trademark Araldite— AN–100. Other suitable adhesives could of course be used.

It will readily be understood that if lead tellurite glass is to be used as the dielectric, which glass has a dielectric constant of about 25–30, the zinc sulfide copper-activated phosphor as heretofore described is first provided with a thin protective coating such as silica by means as described in the heretofore mentioned Beese patent. It may be desirable to paint or otherwise protect the exposed sides of the glass not covered by the electrodes, although this is not necessary.

It will be recognized that the objects of the invention have been achieved by provision of a method of forming a thin sheet of phosphor-embedded glass in which there are substantially no discontinuities and/or air bubbles and which sheet may be fabricated into an electroluminescent cell. This thin sheet may be used in applications where the sheet is exposed to atmospheric water vapor and there will be substantially no tendency to absorb this water vapor. Also, the thin sheet of phosphor-glass may be operated at elevated temperatures, which may approach the softening temperature of the glass.

While in accordance with the patent statutes, one best known embodiment of the invention has been illustrated and described in detail, it is to be particularly understood that the invention is not limited thereto or thereby.

We claim:

An electroluminescent cell comprising two electrodes having a thin layer of phosphor embedded glass sandwiched therebetween, said glass being lead tellurite, and said phosphor comprising multiple particles each surrounded by a thin protective coating.

References Cited in the file of this patent

UNITED STATES PATENTS

| | | |
|---|---|---|
| 2,049,765 | Fischer | Aug. 4, 1936 |
| 2,151,496 | Beese | Mar. 21, 1939 |
| 2,208,034 | Korach et al. | July 10, 1940 |
| 2,314,824 | Greene | Mar. 23, 1943 |
| 2,508,901 | Bellezza | May 25, 1950 |
| 2,566,349 | Mager | Sept. 9, 1951 |
| 2,689,188 | Hushley | Sept. 14, 1954 |

OTHER REFERENCES

Seare: Encyclopedia of Ceramics Ind., published by Ernest Benn Ltd. London, 1930, vol. 3, p. 171.